United States Patent [19]
Deyerle

[11] 3,815,590
[45] June 11, 1974

[54] OFF-SET TRIAL PROSTHESIS DEVICE AND METHOD FOR HIP PROSTHESIS SURGERY

[76] Inventor: William Minor Deyerle, 2222 Monument Ave., Richmond, Va. 23220

[22] Filed: May 2, 1973

[21] Appl. No.: 356,294

[52] U.S. Cl................. 128/92 EB, 128/92 CA, 3/1
[51] Int. Cl. ...... A61f 5/04, A61f 1/24, A61b 17/18
[58] Field of Search.... 3/1; 128/92 C, 92 CA, 92 R, 128/92 E, 92 EB, 92 F, 83

[56] References Cited
UNITED STATES PATENTS

| | | | |
|---|---|---|---|
| 3,102,536 | 9/1963 | Rose et al. | 128/92 CA |
| 3,320,951 | 5/1967 | Wittebol | 128/92 CA |
| 3,670,724 | 6/1972 | Bosacco | 3/1 X |
| 3,782,373 | 1/1974 | Smythe | 128/92 EB |

Primary Examiner—Richard A. Gaudet
Assistant Examiner—Ronald L. Frinks
Attorney, Agent, or Firm—Mason, Fenwick & Lawrence

[57] ABSTRACT

An off-set trial prosthesis device, and a method of use thereof, for precisely locating the proper final amputation site on the femur in performing hip prosthesis surgery or total hip surgery, including a body member to position against the femur having a recurved outer portion forming a handle, and including an inwardly off-set member having a threaded stud for mounting various sizes of replicas of femur prosthesis heads thereon. The template has plural drill guide holes through which a drill bit is passed to drill a series of holes in the femur demarking the precise location for final amputation of the femur to receive a femoral prosthesis member.

11 Claims, 5 Drawing Figures

PATENTED JUN 11 1974 3,815,590
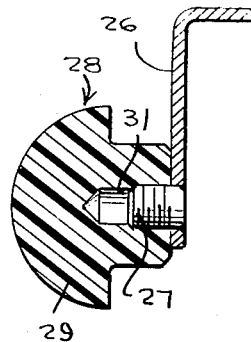
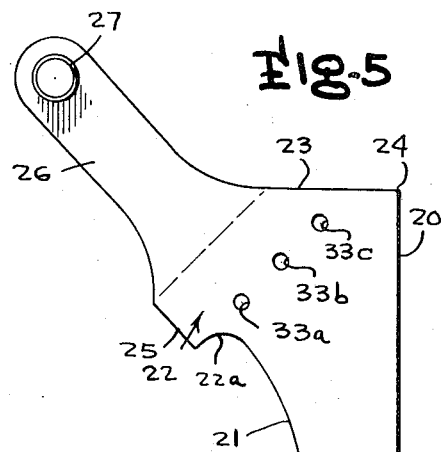
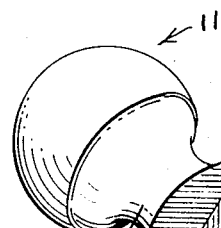
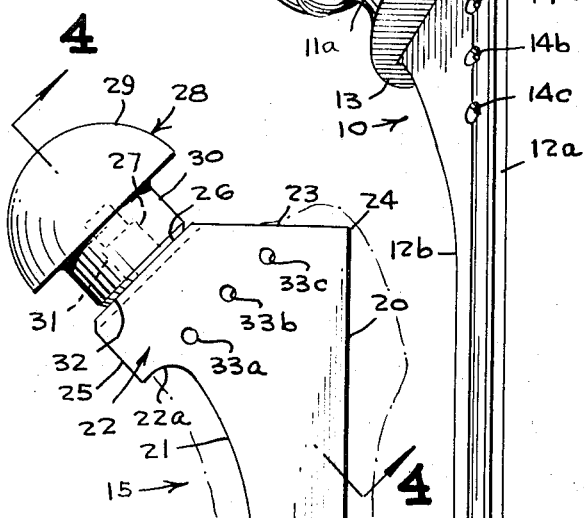
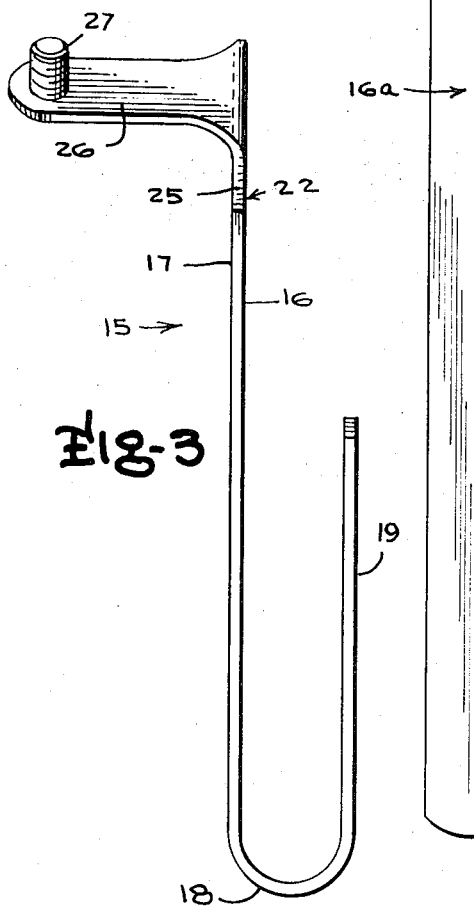

OFF-SET TRIAL PROSTHESIS DEVICE AND METHOD FOR HIP PROSTHESIS SURGERY

BACKGROUND AND OBJECTS OF THE INVENTION

The present invention relates in general to methods and apparatus for properly locating demarking holes in the femoral shaft of the thigh bone for precisely locating the amputation site to enable amputation of the head portion of the femur at the exact location for receiving and fixing the femoral or head prosthesis member in the femur shaft in connection with performing total and subtotal hip prosthesis surgery, and more particularly to the provision of a novel off-set trial prosthesis device for achieving precise location of the femur amputation so that conventional prosthesis head member or femoral member may be inserted and fixed in the amputated femur at the proper location.

Heretofore, total hip prosthesis surgery has been performed wherein a cup is fitted to the acetabulum and a head or femoral prosthesis member, which comprises a stem or shank portion and an artificial head, is fixed to the femur to provide a prosthetic hip joint. The fixation of the shank portion of the prosthesis (the head member) in the shaft of the femur has been attempted by cementing the shank in the femur shaft for example by a bone cement such as methyl methacrylate, and by a press fit. It has been discovered that the use of methyl methacrylate bone cement may present a serious hazard to the patient, as pointed out in the recent article by Edith R. Kedes, M.D., et al., entitled Inoperative Death Associated With Acrylic Bone Cement, Journal American Medical Association, Volume 222, No. 5, pages 575–577, Oct. 30, 1972. Considerable difficulties would be encountered in properly locating and fixing the femoral portion or head prosthesis member in proper position in the femur shaft if fixation bolts were to be used, because of difficulty in exactly locating the holes to be drilled through the femoral shaft to aline with the preformed holes in the shank of the femoral prosthesis member and intersect the seating recess or canal which is reamed in the femoral shaft to receive this shank.

An object of the present invention is the provision of a novel method of accurately drilling holes in the femur in performing total hip prosthesis surgery to properly locate the femur amputation site, and a novel off-set trial prosthesis device which will be properly positioned in relation to the femur shaft to guide the drilling of amputation site marking holes while holding the hip in anatomic position with strong traction, after which the final femur amputation is performed, the canal for the prosthesis is reamed, and the prosthesis is installed with an accurate press fit enhancing the stability of the prosthesis or total hip.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of the femoral component of a total hip prosthesis, to which the present invention relates;

FIG. 2 is a front elevation view of the off-set trial prosthesis device of the present invention, shown in position of use adjacent the initially truncated femur indicated in broken lines;

FIG. 3 is a side elevation view thereof, viewed from the left hand side of FIG. 2, with the head member removed;

FIG. 4 is a fragmentary section view, taken along the line 4—4 of FIG. 2; and

FIG. 5 is a plan view of the strap metal blank for the trial prosthesis, before bending into final shape.

DETAILED DESCRIPTION OF THE PREFERRED EMBODIMENT

In the performance of the total hip prosthesis by the lateral approach, the technique for insertion of the total hip prosthesis by the lateral approach will first be generally reviewed. After the fascia has been opened and the trochanter with its abductor muscles identified, abductors are carefully dissected off of the trochanter up to its proximal one-half to three-quarters of an inch. The abductors are left attached to this proximal tip of the trochanter. The proximal tip of the trochanter is carefully osteomotized to avoid any fracture of the distal stock of the femur, which osteotomy may be accomplished with a power saw. A piriformis is frequently attached near the osteotomy site and this is released, and the external rotators which are usually attached partially to the released portion of the trochanter and partially to the distal femur, are individually released. The anterior capsule and the expansion of the origin of the rectus femorus are identified and removed with the cutting cautery. The lateral capsule is separated from the few fibers of the abductor muscles and it also is removed with the cutting cautery. The capsule is delineated carefully from the rectus femorus and the medial portion of the capsule is removed. The posterior capsule is then removed with the cutting cautery.

The head and neck of the femur are removed directly in a transcervical direction with either a power saw, Gigley saw, or a sharp osteotome, taking care not to fracture the distal stock of the femur. Using the conventional template for the cup member of the total prosthesis, the position of the cup is checked to see how the cup will seat at a 30° angle. The conventional acetabular index template is used to determine the 30° angle, and the degree of reaming that will be necessary is determined at this point. Making every effort to protect the lateral quarter of inch cartilage in the acetabulum, the cartilages are removed with sharp dissection and reaming the medial portion of the acetabulum. After the cartilage has been removed, small reamers are used to gradually ream the recipient acetabulum to accept the cup.

The acetabular index template is reinserted at intervals to determine the proper fit for the cup. A template is used to start the slots for the phalanges on the cup. A sharp instrument is then used to deepen these to appropriate depths. At least three screws for fixing the cup in the acetabulum are then inserted.

Previous orientation with simple prostheses and cups have tended to err on the side of a loose fit. However, the exact opposite is true with the total hip prosthesis, as an extremely tight fit is essential. In order to obtain a tight fit, an estimate should be made of the amount of the neck of the femur to be removed to obtain this fit. Then slightly less than the estimated amount should be removed. This must be done with power instruments in order to avoid fracture. The final amputation site of the neck should then be carefully marked preferably with the trial prosthesis of the present invention and drill, and the final amputation of the neck made. This is approximately one finger breadth above the lesser trochanter. Prior to the final amputation it is important to identify the most inferior portion of the neck and calcar-femorali and mark it using the cutting cautery. This will usually be found to be slightly anterior to the lesser trochanter and should be marked down to at least as low as the lesser trochanter, regardless of how much neck is removed, the proper line for the inferior edge of the prosthesis will always be visible. This marking may also be accomplished with the use of the burr on an air power instrument.

Prior to any of this surgery in the region of the abductors, a wet lap sheet is placed from the anterior portion of the wound through the posterior portion of the wound around the abductor muscles. This identifies and protects them throughout the procedure. It is well to have this during the preparation of the acetabular portion also as the wet lap sheet around the deltoid tends to hold moisture in these muscles which could otherwise become dry and have a lowered resistance.

A rasp is then used to form the seating recess or canal in the amputated femur shaft. The outline of the insertion of the prosthesis shank is then marked, in the proper plane, with a conventional osteotome or a box osteotome. Preferably, a rasp is used that cuts only on the calcar femorali side which leaves a smooth side of the reamer or rasp in contact with the abductor muscles. The rasp is advanced down the canal, using a curette if necessary to palpate the lining of the canal. The rasp is inserted at an increasing distance down the canal and then retracted and the canal cleaned out. In patients with previous surgery, a large amount of cutting at the region of the insertion will be necessary using sharp osteotomes to perform the task. Sharp cutting at this time may avoid the possibility of fracturing either the greater trochanter or the calcar-femorali by attempting to use a rasp in those cases where there is an increase of cortical type bone in the region of the trochanters. This is particularly true in those patients who have had previous surgery, either osteotomies, bonegrafts, or other bony surgery in the region of the hip. An x-ray on the table before closure will avoid a misplacement of any of the components.

The configuration of the femoral component or head member of the total hip prosthesis which is to be installed and fixed in the amputated femur shaft is illustrated in FIG. 1 of the accompanying drawings, and is indicated by the reference character 10. The femoral prosthesis member is an integral prosthetic device comprising a head formation 11 having a neck 11a and defining a highly polished spherical head to interfit in the socket defined by the cup member of the total prosthesis, and has an elongated shank or stem portion 12 which is substantially flat, extending from the flange formation 13 at the base of the neck 11a of the head formation 11. The shank 12 includes a plurality of transverse holes 14a, 14b and 14c extending through the shank 12 near its upper end, which may be about ¼ inch in diameter, to receive three bolts, for example, 2 inch bolts of ¼ inch diameter, designed to extend transversely through the femur shaft and accurately and precisely fix the prosthesis shank in the femur in a manner which effectively resists the torque on the prosthesis head and conveys the stress from the prosthesis member to the hard cortex without either rotary or piston like motion. The shank 12 of the prosthesis member is substantially flat and is of elongated tapering configuration having a straight inner edge 12a and a substantially concavely tapering outer edge 12b.

The off-set trial prosthesis of the present invention is indicated in general by the reference character 15 and comprises a main body of strap metal or the like, indicated generally by the reference character 16, bent into its final shape from a flat blank 16a of strap metal, preferably of the shape illustrated in FIG. 5. In its final form, the trial prosthesis body has a generally U-shaped configuration in end view, as shown in FIG. 3, defining an inner main planiform body panel 17 integrally joined by a curved 180° bight 18 at its lower end to an outer, upwardly extending elongated handle section 19. The handle section 19 in the preferred embodiment extends upwardly in outwardly overlapping relation over about the lower two-thirds of the inner body panel 17 and may in one preferred embodiment be about 3½ inches long. In the preferred embodiment the straight portion of the blank 16a is about ¾ inch wide and 8 inches long, while the straight edge 20 of the blank is about 10½ inches long.

The upper region of the inner body panel 17 conforms generally to the shape of the upper end portion of the prosthesis that is to be used, and has an outwardly flaring or concavely curved outwardly tapering edge 21 opposite the straight edge 20, which generally corresponds to the contour of the concavely tapering outer edge portion 12b of the prosthesis shank. The concavely tapering edge 21 of the trial prosthesis body panel 17 terminates at its upper end in a downwardly inclined shoulder formation 22 having an inclined edge 22a which corresponds to the location of the shoulder flange 13 at the base or bottom of the neck 11a of the femoral prosthesis member. The top edge 23 of the body panel 17 lies at right angles to the straight vertical edge 20 and forms a right angle corner 24 therewith, while the other upper corner portion of the panel 17 forms an upwardly and outwardly inclined extension above the shoulder formation 22 defined by short edge 25 at right angles to inclined edge 22a and an inclined, inwardly off-set flange or arm 26, formed integrally of the same flat stock from which the main body is formed, and lying in an inclined plane perpendicular to the plane of the panel 17 and at a 45° angle to the straight edge 20.

The inwardly off-set arm 26 supports a threaded stud or post 27 forming a mounting post for any one of a plurality of nylon heads 28. A set of nylon heads 28 is provided, corresponding to the usual sizes of unipolar prosthesis or acetabular sockets, or total hip sockets, such as a large socket, an intermediate size socket, and a small socket, the nylon head 28 having a hemispherical dome or top portion 29 and, if desired, having a slightly constricted neck 30 as illustrated in FIG. 2, or if desired the region corresponding to the constricted neck 30 may be merely an extension of the spherical surface of the dome or top portion 29. A bushing or internally threaded socket formation 31 is provided in the bottom wall 32 of the nylon head 28, by which the nylon head of the chosen size is threaded onto the post 27 of the trial prosthesis 15. If desired, washers may be inserted over the post 27 between the confronting surfaces of the arm 26 and head 28 to elongate the neck to correspond to the outline or profile of the prosthesis to be used.

The upper region of the body panel 17 is provided with a series of three drill guide holes 33a, 33b and 33c arranged along an axis inclined at 45° to the straight edge 20. For example, the drill guide holes 33a, b and c may be holes that are 0.128 inch in diameter spaced seven-sixteenth's of an inch apart on centers, with the center of the lowermost holes spaced approximately ½ inch from the edge portion 25 adjoining the shoulder 22a.

In the use of the trial prosthesis or template 15, after the preliminary amputation of the neck of the femur has been accomplished as previously described, the nylon head 28 of the trial prosthesis corresponding to the size of the socket into which the femoral prosthesis head is to be fitted is threaded onto the post 27 of the trial prosthesis and is placed in the acetabular socket with the inner body panel 17 of the trial prosthesis arranged parallel with the shaft of the femur and closely adjacent the surface of the femur. An assistant pulls down firmly on the shaft of the femur to give the maximum length for a very tight fit, and drills are inserted through the three holes 33a, 33b and 33c and operated to drill holes into the femur neck perpendicular to the neck to mark the final amputation site of the neck. These three holes drilled in the femur neck mark the exact location for the final amputation of the neck to correspond to the shoulder or bottom surface 13 of the neck flange on the femoral stem. In this manner, the surgeon is able to locate the amputation site at exactly the proper place to obtain an extremely tight fit when the femoral prosthesis component is inserted in the final position. If desired, the marking of the final amputation site by drills inserted through the holes 33a, 33b and 33c can be carried out with traction on the femur, recreating the desired anatomic relation to provide a proper length limb after the final amputation of the femur neck. Use of the trial prosthesis of the present invention is equally facile in anterior, posterior, or lateral surgical approach.

What is claimed is:

1. A trial prosthesis device for use in performing hip prosthesis surgery on a patient involving fixation in an amputated femur of a femoral prosthesis component having an elongated shank portion and a selected size head formation having a base flange surface, the trial prosthesis serving to precisely locate the proper final planar amputation site on the neck of a preliminarily amputated femur for abutment against said base flange surface, comprising an elongated body of flat strap-like stock adapted to be positioned in outwardly adjacent axial alinement with the femur shank and having an inwardly projecting arm extending from an upper region of the body terminating in a mounting formation spaced inwardly from the longitudinal axis of the body, a facsimilie head member having its exterior surface in the configuration of a spherical segment conforming to portions of said head formation releasibly fastened on said mounting formation to be fitted in the acetabulum socket or total hip socket of the patient, said body having a row of drill guide holes therethrough alined precisely with the plane of the final amputation site for proper positioning of said base flange surface to receive a drill through said holes for demarking by drill holes made in the femur neck the proper location of said final amputation plane.

2. A trial prosthesis device as defined in claim 1, wherein said plane of said final amputation site is inclined to the axis of the femur shank at a predetermined angle, and said arm is of planiform configuration extending perpendicularly inwardly from said body in a plane inclined at said angle to the longitudinal axis of said body.

3. A trial prosthesis device as defined in claim 1, wherein said plane of said final amputation site is inclined to the axis of the femur shank at a predetermined angle, and said arm is of planiform configuration extending perpendicularly inwardly from said body in a plane inclined at said angle to the longitudinal axis of said body paralleling and spaced outwardly beyond said row of drill guide holes relative to the midportion of the body.

4. A trial prosthesis device as defined in claim 1, wherein said body is a substantially U-shaped strap member in lateral profile having a longer and a shorter leg with the longer leg to be located nearer the femur and the shorter leg defining an outwardly spaced handle formation.

5. A trial prosthesis device as defined in claim 3, wherein said body is a substantially U-shaped strap member in lateral profile having a longer and a shorter leg with the longer leg to be located nearer the femur and the shorter leg defining an outwardly spaced handle formation.

6. A trial prosthesis device for use in performing hip prosthesis surgery on a patient involving fixation in an amputated femur of a femoral prosthesis component having an elongated shank portion and a selected size head formation having a base flange surface, the trial prosthesis serving to precisely locate the proper final planar amputation site on the neck of a preliminarily amputated femur for abutment against said base flange surface, comprising a strap-like body member having a flat planiform vertically elongated inner stem portion adapted to be positioned immediately adjacent the surface of the femur shank paralleling the axis of the latter, the stem portion having upper and lower end portions, a handle formation integrally joined to and extending outwardly from the lower end portion of said stem portion, the upper end portion of said stem portion having first and second opposite lateral edges defining a progressively upwardly enlarging, outwardly tapering formation at the top of the stem portion and an inwardly projecting off-set arm joining said tapering formation to extend in spaced partially tapping relation to the preliminary amputation site, a removable head of said selected size having a spherical segment external surface to be seated in the acetabulum socket of the patient and having coupling means for removably mounting the head on said off-set arm, and said tapering formation of said upper end portion having a row of drill guide holes therethrough alined precisely with the plane of the final amputation site for insertion of a drill therethrough to drill holes into the femur neck to demark the location of the final amputation plane.

7. A trial prosthesis device as defined in claim 6, wherein said plane of said final amputation site is inclined to the axis of the femur shank at a predetermined angle, and said arm is of planiform configuration extending perpendicularly inwardly from said stem portion in a plane inclined at said angle to the longitudinal axis of said stem portion.

8. A trial prosthesis device as defined in claim 6, wherein said plane of said final amputation site is inclined to the axis of the femur shank at a predetermined angle, and said arm is of planiform configuration extending perpendicularly inwardly from said stem portion in a plane inclined at said angle to the longitudinal axis of said stem portion paralleling and spaced outwardly beyond said row of drill guide holes relative to the midportion of the stem portion.

9. A trial prosthesis device as defined in claim 6, wherein said body member is a substantially U-shaped strap member in lateral profile having a longer and a shorter leg with the longer leg defining said stem portion and the shorter leg defining said handle formation.

10. A trial prosthesis device as defined in claim 8, wherein said body member is a substantially U-shaped strap member in lateral profile having a longer and a shorter leg with the longer leg defining said stem portion and the shorter leg defining said handle formation.

11. A method of precisely locating the final amputation site on the neck of a femur in performing hip prosthesis surgery on a human patient for precise location and fixation of a femoral prosthesis in the femur having a head to fit into the acetabulum socket, comprising the steps of preliminarily amputating the femur neck along a plane located wholly in outwardly and upwardly spaced relation to the final amputation site, positioning a trial prosthesis device having an apertured elongated stem and a head formation corresponding to said prosthesis head to dispose said head formation in the acetabulum socket adjacent said femur and locating the elongated stem of said trial prosthesis device immediately adjacent the femur shank in axial parallelism therewith with the femur pulled to a preselected normal position, inserting a drill through selected apertures in said stem to drill a row of plural holes in a single plane in the confronting portion of the femur for demarking the plane and location of the final amputation site, and cutting through and entirely across the femur in the plane demarked by said drill holes to amputate the femur for reception of the femoral prosthesis in the amputated femur.

* * * * *